United States Patent [19]

Frenkel et al.

[11] Patent Number: 5,041,415
[45] Date of Patent: Aug. 20, 1991

[54] SUPERCONDUCTING NOISE DISCRIMINATOR

[75] Inventors: Anatoly Frenkel, Somerset; Chinlon Lin, Holmdel Township, Monmouth County; Thirumalai Venkatesan, Bridgewater, all of N.J.

[73] Assignee: Bell Communications Research, Inc., Livingston, N.J.

[21] Appl. No.: 311,076

[22] Filed: Feb. 16, 1989

[51] Int. Cl.$^5$ .............................. H04B 1/10
[52] U.S. Cl. ........................ 505/1; 375/99; 375/36; 328/165
[58] Field of Search ............... 375/36, 99, 103, 104; 505/701, 702, 703, 700; 455/307, 308, 334; 328/165; 307/542, 543

[56] References Cited

U.S. PATENT DOCUMENTS

| 3,327,132 | 6/1967 | Cones et al. | 307/543 |
| 3,654,488 | 4/1972 | Traub et al. | 455/308 |
| 3,944,932 | 3/1976 | Fong | 455/307 |
| 3,949,168 | 4/1976 | Taub | 375/36 |
| 4,095,163 | 6/1978 | Montague | 307/542 |

FOREIGN PATENT DOCUMENTS 0244860  10/1988  Japan .................... 505/703

OTHER PUBLICATIONS

John Clarke "Small scale analog applications of high-transition-temperature superconductors" Nature vol. 333, May 5, 1988.
G. A. Sai-Halasz et al, "Experimental Technology and Performance of 0.1 μm Gate-Length Low Temperature Operation MOSFETs," *Extended Abstracts of the 20th Conference on SSDM,* Tokyo, pp. 5-8 (1988).
T. Venkatesan et al, "Advances in Processing High-Temperature Superconducting Thin Films with Lasers," *American Chemical Society,* pp. 235-264 (1988).
J. H. Bremer and V. L. Newhouse, "Current Transitions in Superconductive Thin Films," *Physical Review* 116(2), 309-313 (Oct. 1959).
Inam et al, "As-Deposited High $T_c$ and $J_c$ Superconducting Thin Films made at Low Temperatures," *Appl. Phys. Lett.* 53(10), pp. 908-910 (Sep. 1988).
Bremer and Newhouse,"Thermal Propagation Effect in Thin Superconducting Films," *Physical Review Letters* 1(8), pp. 282-284 (Oct. 1958).
Frenkel et al, "High $T_c$ Superconducting Film as a Fast Nonlinear Switch for Noise Discrimination in Digital Circuits," *Appl. Phys. Lett.* 53(26), pp. 2704-2706 (Dec. 1988).

Primary Examiner—Douglas W. Olms
Assistant Examiner—Stephen Chin
Attorney, Agent, or Firm—Charles S. Guenzer

[57] ABSTRACT

A noise limiter for a binary circuit in which a thin film superconductor is put in shunt between a transmission line and ground. The thin film exhibits a gradual transition region as a function of current between normal conduction and the completely superconductive state. The dimensions of the thin film are chosen such that a high level signal on the transmission line falls in the gradual transition region and the impedance of the shunt is greater than the characteristic impedance of the transmission line while a noise component on the low level signal falls in the superconductive region and therefore is reflected by the zero-impedance shunt.

12 Claims, 6 Drawing Sheets

SUPERCONDUCTING NOISE DISCRIMINATOR

FIELD OF THE INVENTION

The invention relates generally to noise limiting circuits. In particular, it relates to a superconducting noise limiter.

BACKGROUND OF THE INVENTION

It is well known that digital signals that assume one of two voltage levels on a transmission line are prone to noise. Various schemes are available to restore the signals to their noise-free binary levels. However, these schemes introduce unsatisfactory time delays into the system since they must react to a time varying signal. The greater the time delay, the lower the bandwidth of the signal which can be carried on the transmission line with the noise limiter.

Furthermore, most noise limiters are relatively complex requiring multiple components, some of which may involve semiconductor junctions. If a non-linear component is used, it is likely to be of a composition different from other parts of the circuit. Such a difference in compositions makes it difficult to include the noise limiters in an integrated circuit.

SUMMARY OF THE INVENTION

Accordingly, it is an object of this invention to provide a digital noise limiter which has a very fast response time.

It is another object of the invention to provide a noise limiter of simple design and using materials otherwise used in an integrated circuit.

The invention can be summarized as a superconductive thin film used as a noise limiter in a digital data circuit. The thin film exhibits in its resistance vs. DC current characteristics a gradual transition region between the zero-resistance, superconducting region and the abrupt transition region to the normal resistance state. The thin film shunts the data line to ground. Its resistance is selected such that a high level data signal puts the thin film in the transition region with sufficient resistance that the signal is not appreciably affected by the shunt while a low level signal with a limited amount of noise leaves the thin film in the superconducting region so that the noise is not transmitted past the zero-resistance shunt.

DETAILED DESCRIPTION

Figure 1:
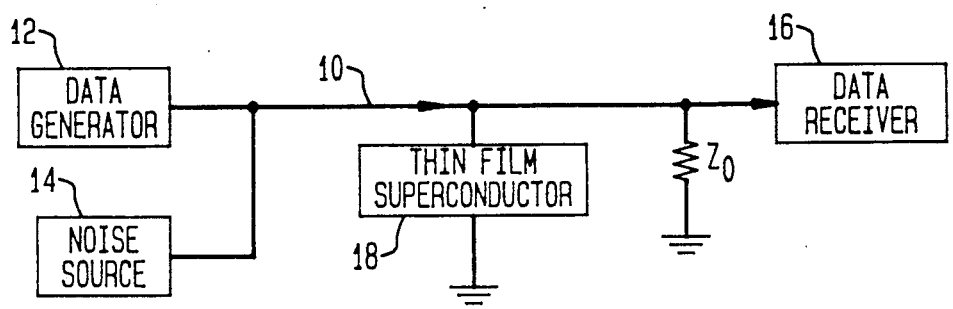
FIG. 1 is a schematic diagram of the electrical circuit in which the noise limiter of the present invention is used.

The noise limiter of the invention is illustrated in FIG. 1. Digital data consisting of pulses of high and low level voltages are impressed on a transmission line 10 by a data generator 12. The transmission line 10 has a characteristic impedance $Z_0$. A noise source 14, simulating the real-life source of noise, impresses noise onto the transmission line 10 so that the signals seen by a data receiver 16 are the sum of data signal and the noise. Of course, in most applications the noise source 14 is not intentionally connected to the system but is an artifact of either the data generator 12 or the transmission line 10 or both.

Figure 2:
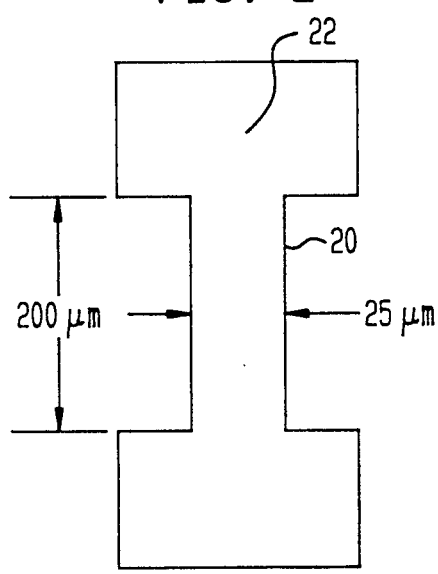
FIG. 2 is a plan illustration of the superconducting thin film of the the noise limiter of the invention.
Figure 3:
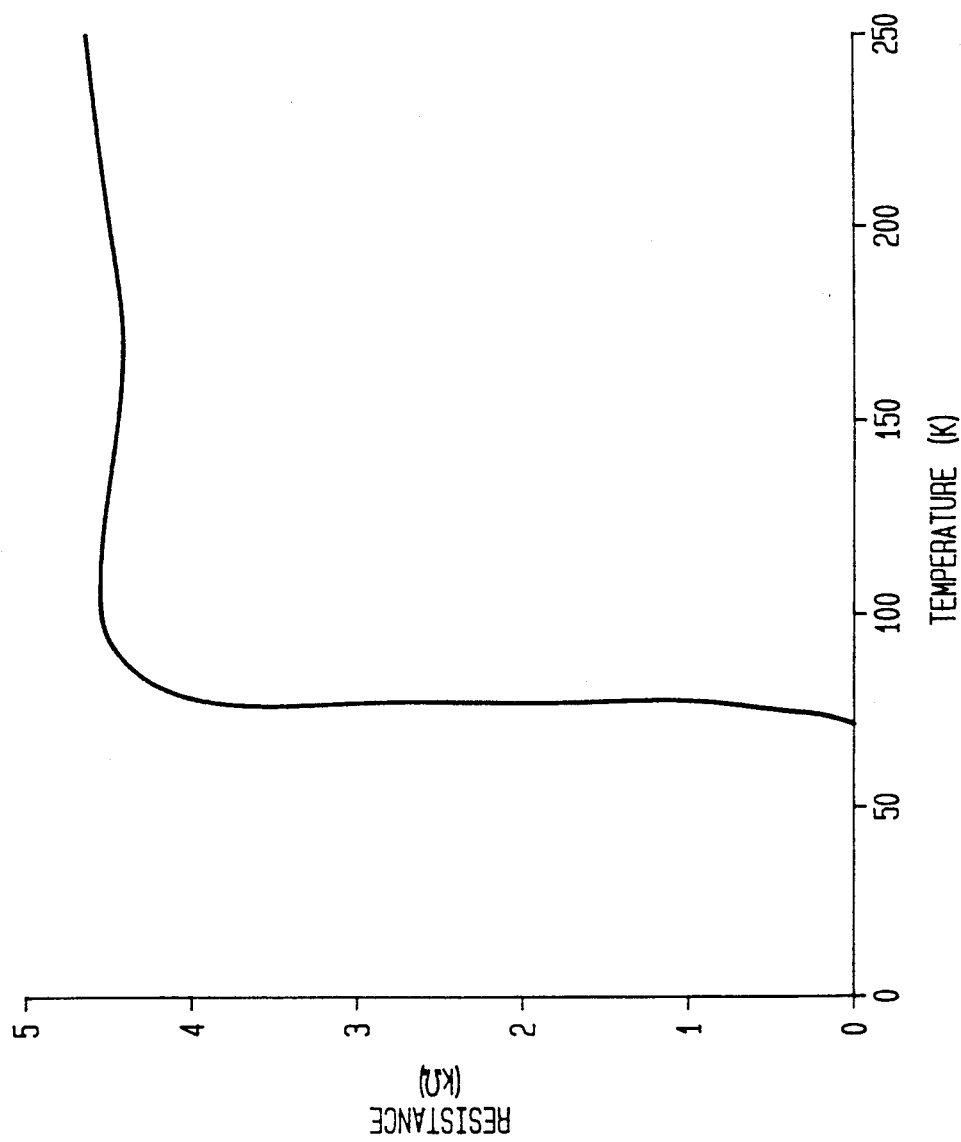
FIG. 3 is a graph of the resistance vs. temperature characteristic of the superconducting thin film.

The noise limiter itself consists of a superconducting thin film 18 connected in shunt between the transmission line 10 and ground. The thin film was prepared from a bulk superconductor of $Y_1Ba_2Cu_3O_7$ by a pulse laser evaporation technique described by Venkatesan et al in an article entitled "Advances in Processing High-Temperature Superconducting Thin Films with Lasers" appearing in the Proceedings of the ACS on "The Chemistry of the Novel High $T_c$ Superconductors", Los Angeles, Sept. 26–29, 1988 at pages 235 to 264. YBaCuO is one member of a class of superconductors $Z_1Ba_2Cu_3O_7$, where Z is a rare-earth element such as Y, Er, Gd and Eu. Another example of a high $T_c$ superconductors is $A_2B_2Ca_{2n-1}Cu_nO_y$, where A is either Bi or Ti, B is either Ba or Sr, n=1, 2 or 3 and y is any value between 6 and 10. The film was deposited in an oxygen ambient of 10 mTorr at 650° C. to a thickness of 0.1 $\mu$m on a substrate of strontium titanate. At this point, the zero-resistance temperature was about 83° K. Prior to contact evaporation, the sample was plasma oxidized for 5 min at 100 W. Then, silver contacts of 1×1 mm in dimensions were deposited by electron beam evaporation. The contact resistance $r_c$ was measured to be less than 0.25 Ω at 70° K. The thin film was patterned into the form of a bridge 20, illustrated in FIG. 2, which was 200 $\mu$m wide. Contact areas 22 were approximately 1×1 mm in size. The patterning was done by optical lithography and chemical etching in a 1:60 solution of phosphoric acid. The resistance $r_s$ vs. temperature characteristics for the so processed film were measured with 100 $\mu$A DC current and are shown in FIG. 3. The film had a superconducting transition temperature $T_{c0}$ of 75° K. and a room-temperature resistance of about 5 kΩ.

Figure 4:
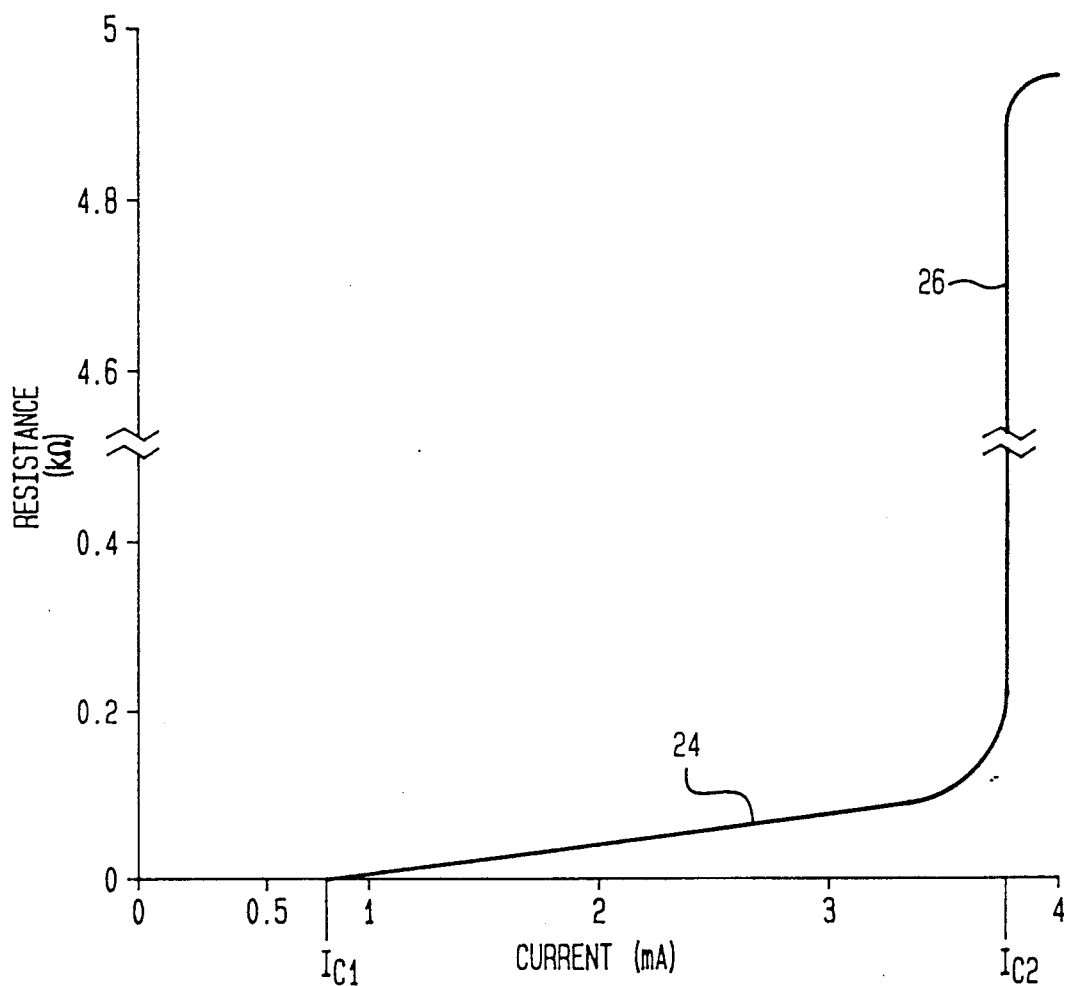
FIG. 4 is a graph of the resistance vs. current characteristic of the superconducting thin film.

The thin film 18 was held in a cryostat at 70° K. and the resistance vs. DC electrical current was measured to be as shown in FIG. 4. The thin film exhibited a lower critical current $I_{c1}$ of 0.8 mA, below which the film was completely superconducting, and an upper critical current $I_{c2}$ of 3.78 mA, above which the film was completely in the normal state. However, there was a broad and gradual transition region 24 for which currents the resistance of the film was finite but significantly below the normal resistance. In the gradual transition region 24, the resistance changes between zero ohms at $I_{c1}$ and about 225 Ω at just below $I_{c2}$. At the upper critical current $I_{c2}$, there is an abrupt transition 26 to the normal state. The currents observed in our thin films correspond to a critical current density $J_C$ of 0.3 to 1.5×10⁵ A/cm² at 70° K., which is poorer than similarly prepared films recently reported by Inam et al in a technical article entitled "As-deposited high $T_c$ and $J_c$ superconducting thin films made at low temperatures" and appearing in Applied Physics Letters, volume 53, 1988 at pages 908 to 910. Although, it appears that this is the first measurement of such a gradual transition region 24 in high $T_c$ superconductors, similar effects have been observed previously in low $T_c$ superconductors, as has been reported by Bremer et al in two technical articles entitled "Thermal Propagation Effect in Thin Superconducting Films" appearing in Physical Review Letters, volume 1, 1958 at pages 282 to 284 and entitled "Current Transitions in Superconductive Thin Films" appearing in Physical Review, volume 116, 1959 at pages 309 to 313.

It is believed that the gradual transition region 24 is caused by an isothermal current-induced transition due to some inhomogeneous structure in the film, such as strain or impurities, which form resistive channels across the bridge in a very short time. That is, the inhomogeneity causes current to deflect laterally away from it. The current deflection increases the current density on the lateral side to a value above the critical current, thereby further laterally deflecting the current until the film is completely resistive at at least in a channel laterally spanning it. The effect is electronic and should therefore be very fast. The resistance in the gradual transition region 24 is substantially less than in the region above $I_{c2}$. The ratio of the resistance in the normal region to that in the gradual transition region 24 depends on many effects but a factor of at least five probably defines an operable noise limiter.

On the other hand, the abrupt transition region 26 shown for the DC measurements is most likely caused by spontaneous thermal propagation. Such thermal effects should operate on time scales much longer than electronic time scales. It is noted here that, if the resistance vs. current curve of FIG. 4 had been measured with relatively short pulses, the abrupt transition region 26 would have shown a much milder transition on the high-temperature side, thus manifesting the thermal time scales involved.

Figure 5:
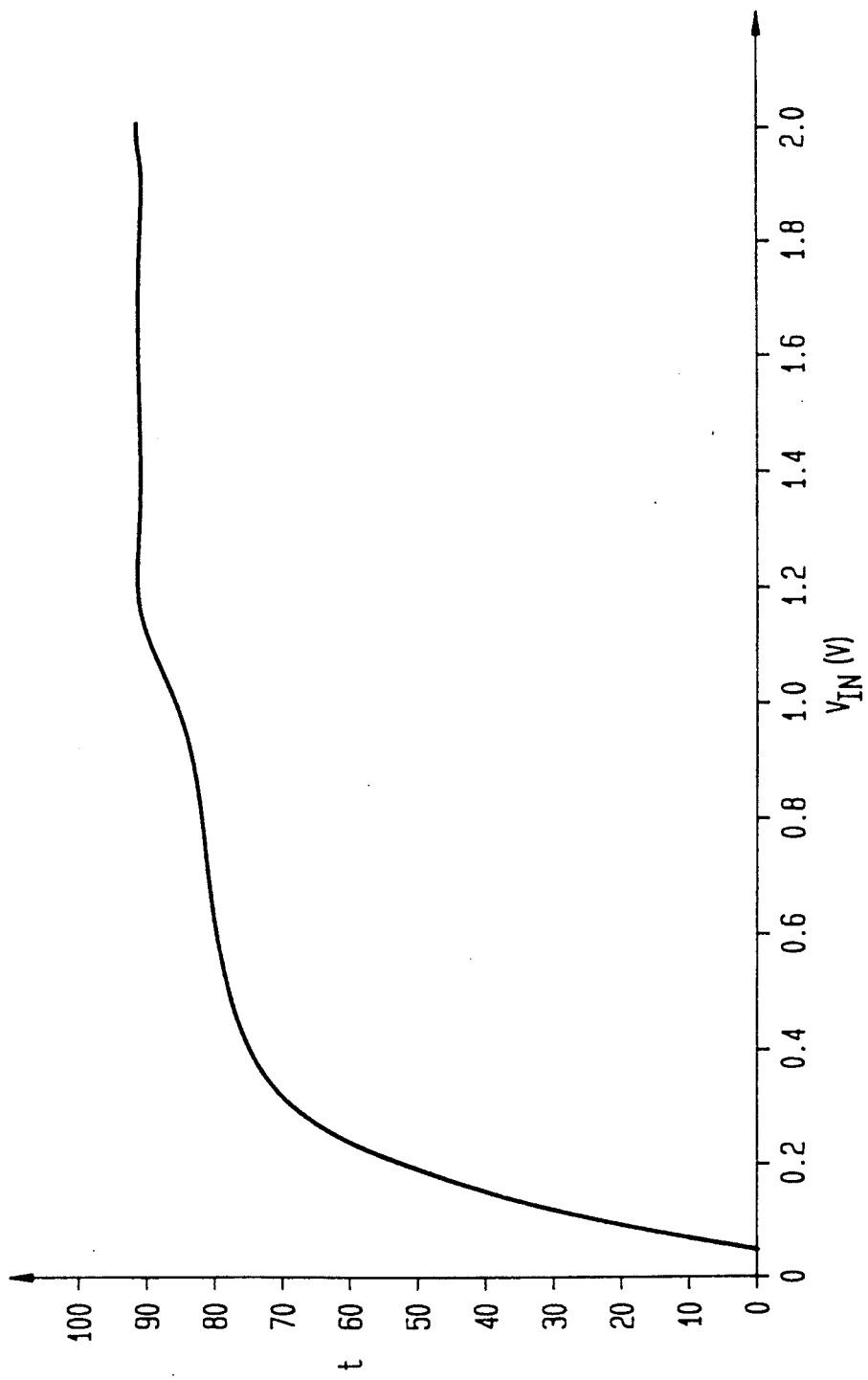
FIG. 5 is a graph of the transmission coefficient for the noise limiter of the invention as a function of the input voltage.

The superconducting thin film 18 introduces a signal-dependent mismatch into the transmission line 10. The transmission coefficient t across the shunting thin film 18 for a signal on the transmission line 10 is given by $$t = \frac{2R_s}{2R_s + Z_0}$$

where $$R_s = r_s + 2r_c,$$

that is, the contact resistances $r_c$ are added to the instantaneous resistance $r_s$ of the thin film 18. Therefore, for the small contact resistances measured here and for a characteristic impedance $Z_0$ of 50 Ω, the transmission coefficient t is effectively zero when the thin film 18 is superconductive below the lower critical current $I_{c1}$. For larger currents, the transmission coefficient t increases. The measured transmission coefficient t, as a function of the voltage amplitude of the incident pulse, is illustrated in FIG. 5. When the incident voltage $V_{in}$ is below 20 mV, the thin film 18 is superconductive and virtually none of the signal is passed. Above 20 mV, the transmission coefficient increases to about 85% at 1 V, which corresponds to a film resistance of about 225 Ω, the end of the gradual transition region 24.

The invention is effective because the high level data voltage, for instance, 375 mV, is effectively transmitted while noise on the zero level data signal that is below 20 mV is completely blocked and noise that is above 20 mV is partially blocked. Although it would be possible to increase the high level transmission coefficient by placing the high level voltage in the normal conductivity region, instead, according to the invention the high level data signal is placed in the gradual transition region 24. The reason, as explained above, is that the transition to the normal state above $I_{c2}$ is a thermal effect and thus has characteristic times which are longer than the electronic transition times between the superconductive state and the dissipative state in the gradual transition region 24. An input pulse having an amplitude of 375 mV was observed to switch the thin film from the superconductive state to the gradual transition region in 1 ns. These relatively long times are believed to be associated with the very high dielectric constant of the strontium titanate substrate at 70° K. The DC value of the dielectric constant is 2800 at this temperature. A similar superconductive thin film was prepared using MgO as a substrate. The rise and fall times of the input pulse were about 200 ps and the output pulse (transition from the zero-resistance region to the gradual transition region 24) had nearly equal rise and fall times. That is, the broadening was observed to be no more than 200 ps with MgO as a substrate. In order to obtain these transition times, the operating point should be chosen so that the high level data signal with the noise component added in not only falls on the gradual transition region 24 but also avoids the upper portion, e.g., the upper one-third, of the transition region nearest $I_{c2}$ in order to avoid any slow thermal effects.

Therefore, it is seen that the noise limiter described above is effective at blocking noise on the zero level data signals while simultaneously transmitting high level data signals of 375 mV with rise and fall times of 1 ns with strontium titanate substrates and of 200 ps with magnesium oxide substrates. Data rates of 200 Mb/s can be attained with a 1 ns rise or fall times and of 1 Gb/s with 200 ps times or better.

Figure 6:
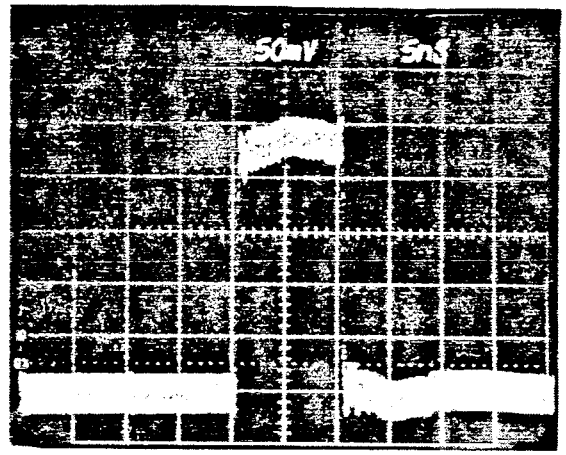
FIGS. 6, 7 and 8 are oscilloscope traces of data signals in a test of the invention.
Figure 7:
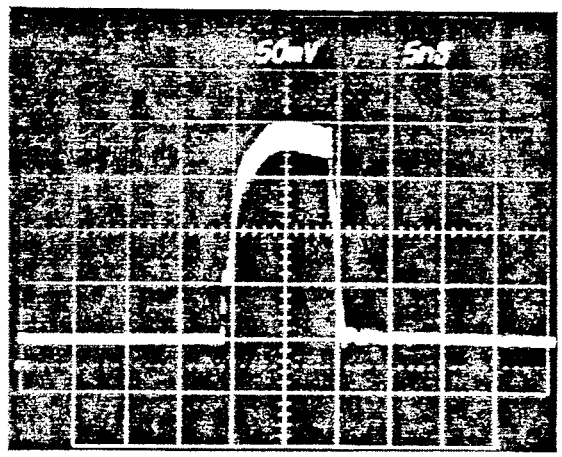
Figure 8:
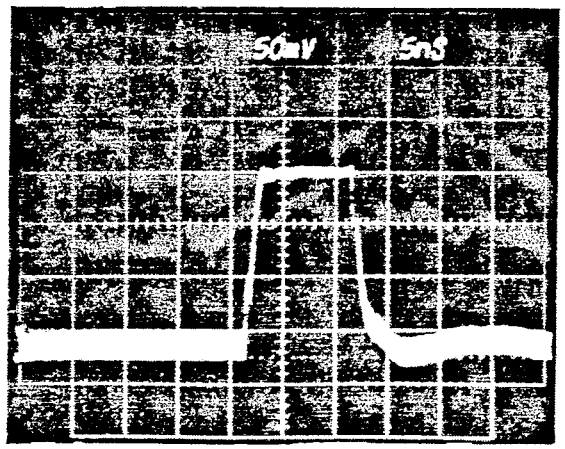

The invention has been tested by using a pulse generator as the data generator 12 which produced 10 ns pulses with an amplitude of 375 mV and fall and rise times of 200 ps. A sine wave generator was used as the noise source 14 and it produced a 100 MHz signal with an amplitude of 20 mV. The two signals were combined on a 50Ω coaxial cable acting as the transmission line 10. An oscilloscope was used as the data receiver 16. The oscilloscope trace of FIG. 6 shows the noise-laden data pulse on the coaxial line without the noise limiter of the invention. The wide bands represent the amplitude of the noise which had a period equal to the pulse width but which was reproduced over many pulses with no synchronization between the sinusoidal noise and the data pulse. The oscilloscope trace of FIG. 7 represents the data pulse after it had passed the superconducting thin film 18 formed on a strontium titanate substrate so that noise was removed from the low level. The oscilloscope trace of FIG. 8 represents the data pulse when the noise had been removed from the upper level only by a level shifting technique to be described later.

At the low signal level, the superconducting thin film 18, contained in a cryostat holding the film 18 at temperatures such that the resistance characteristics of FIG. 4 apply, was completely superconducting since the maximum current through the superconductor (about 0.8 mA) was below the lower critical current $I_{c1}$. Therefore, the sinusoidal noise imposed on the low data signal was significantly reduced, as shown in FIG. 7. At the high signal level, the current through the thin film 18 was about 3.4 mA, which was adequate to switch the thin film to about 75 Ω, resulting in 75% transmission. However, noise was transmitted together with the high level signal.

Figure 9:
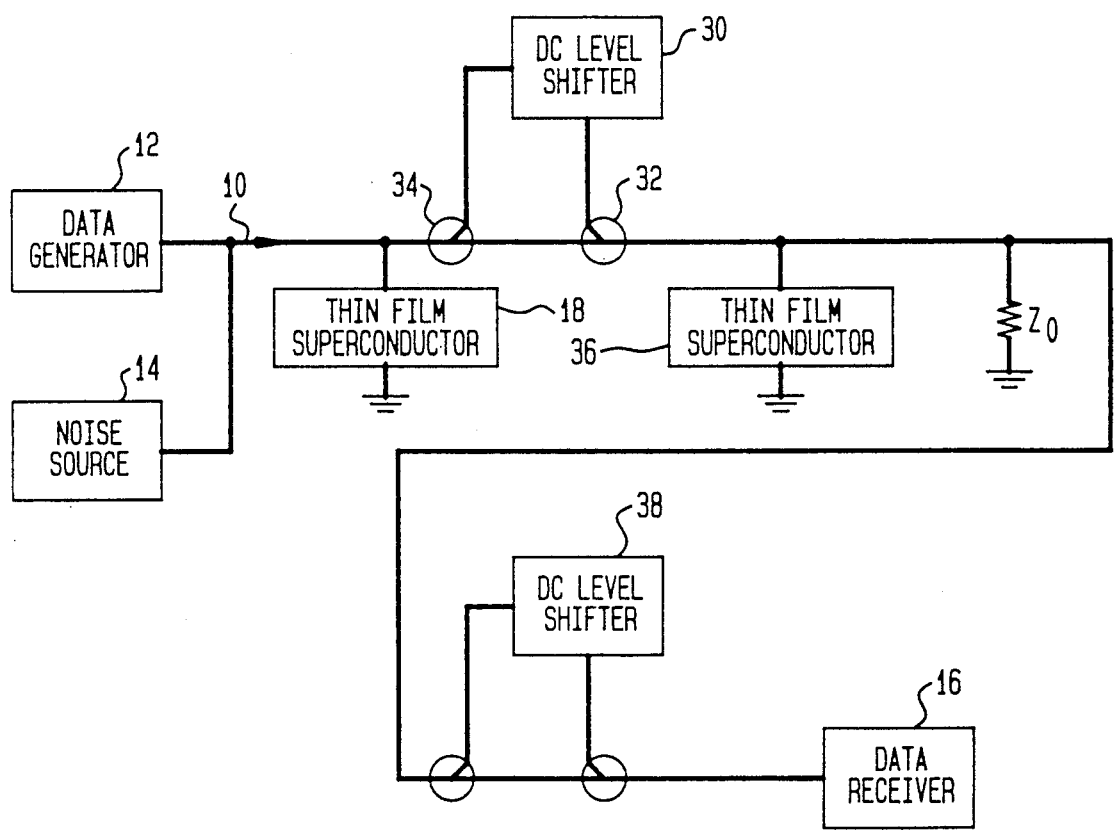
FIG. 9 is a schematic diagram corresponding to FIG. 1 in which noise is eliminated from both levels of the signal.

It is possible to extend the above concept to remove noise from both the high and low signal levels of a digital signal by the use of DC level shifters, as illustrated in FIG. 9. The noise is removed from the low level by the superconductive thin film 18, just as in FIG. 1. Then the levels of the data signal on the transmission line 10 are shifted downward by a DC level shifter so that the high level is now located at zero volts. The low level would thereby be shifted to a negative value, assuming the use of positive logic. The DC level shifter 30 can be a manually adjustable constant current source which adds its DC output to the data signal through a bias tee 32 connected onto the transmission line 10. The DC current is converted to a DC voltage by the characteristic impedance $Z_0$ of the transmission line 10. The bias tee 32 is a conventional device used to add DC and AC voltages and may be a Model 5530 or 5535 available from Picosecond Pulse Labs of Boulder, Colo. Such a bias tee prevents the DC bias from propagating on the input side of the transmission line by capacitive coupling on that side. Alternatively, the DC level shifter 30 may be a constant voltage source. Rather than relying on manual tuning, particularly when the data generator 12 is subject to fluctuations, a small fraction of the signal on the transmission line 10 may be split off by a splitter 34. The averaged value of the high level of that signal, twice the long-term average signal level for many transmission codes, is detected by the DC level shifter 30 which then adjusts its output to bring the high level data signal, with its noise averaged to zero volts.

The signal level that was previously at a high level is now near zero volts with a noise component added thereto. The small noise component is removed by a shunt-connected superconductive thin film 36 of construction similar to the thin film 18. Of course, both the thin films 18 and 36 must be kept at superconducting temperatures.

At this point on the transmission line 10 past the second thin film 36, the noise has been removed from both the low and high levels but the DC level has been shifted. It is possible that the data receiver 16 can directly handle the DC shifted signal. However, the levels can be shifted back to their original polarities by a second DC level shifter 38.

The above described noise limiter was fabricated of YBaCuO and was held near liquid nitrogen temperatures while portions of the remainder of the circuit were at room temperature. Although such a noise limiter is operable, its operation is disadvantageous in that it requires the use of a cryostat to hold the YBaCuO film at the required temperatures. Future superconductors offer the possibility that their transition temperatures will be near or at room temperatures, whereupon the present invention becomes much more advantageous since these future superconductors will likely manifest the same type of electronically mediated gradual transition region at non-cryogenic temperatures.

The present invention has great utility if the electronics are operating at cryogenic temperatures which provide the transition temperatures required for the superconducting noise limiter. Work is proceeding on the development of of YBaCuO or other high $T_c$ materials as the principal constituent of electronic devices operating at liquid nitrogen temperatures, either as Josephson junctions or other electronic devices. If an integrated circuit of such high $T_c$ materials were made, interconnects between different parts of one integrated circuit of between two integrated circuits would also be made of the superconducting material and would be of cross section large enough to keep the interconnect below the critical currents. It is then relatively easy to additionally include one or more thin films of the proper dimensions in shunt between the interconnect and fixed potentials to act as the noise limiters of the present invention.

The invention is applicable to other applications. Sai-Halasz has described cryogenic silicon devices in a technical article entitled "Experimental Technology and Performance of 0.1 μm Gate-Length Low Temperature Operation MOSFETs" appearing in Extended Abstracts of the 20th (1988) International Conference on Solid State Devices and Materials, Tokyo, 1988, at pages 5–8. Such cryogenic silicon MOSFETs have a gate length of 0.1 μm and delays of 13 ps. Such performance would be ideal for integrated circuits but introduces severe demands on the interconnects, particularly those which go substantial distances either on the Si chip or between Si chips for separate cryogenic Si integrated circuits. However, since the liquid nitrogen operation satisfies the superconductive transition temperatures of YBaCuO and other high $T_c$ materials, it has been suggested that the high $T_c$ materials be used for the interconnects. If the interconnect is already being made of the high $T_c$ materials, it becomes relatively easy to additionally form an integral shunt bridge as described above for a noise limiter simultaneously with the formation of the interconnect.

What is claimed is:

1. A noise limiter for limiting noise imposed on one of two binary states distorted by said noise, comprising:
    a transmission line carrying a composite signal comprising binary signals and noise;
    a signal source connected to said transmission line and producing on said transmission line a sequence of said binary signals, each of said binary signals produced on said transmission line being selected to be one of a first voltage level and a second voltage level; and
    a superconductive thin film held at or below its superconductive transition temperature and connected between said transmission line and a predetermined potential, wherein said so connected superconductive thin film has current and resistance characteristics such that said thin film is superconductive when said binary signals are selected to be at said first voltage level and such that said thin film exhibits a finite resistance substantially less that a normal resistance of said thin film when said binary signals are selected to be at said second voltage level.

2. A noise limiter as recited in claim 1, wherein said transmission line has a characteristic impedance and wherein said finite resistance is greater than said characteristic impedance.

3. A noise limiter as recited in claim 1, wherein said superconductive thin film comprises ZBaCuO, wherein said Z is a rare-earth element.

4. A noise limiter as recited in claim 3, wherein said rare-earth element is Y.

5. A noise limiter as recited in claim 4, wherein said thin film is approximately 0.1 micrometer in thickness.

6. A noise limiter as recited in claim 4, wherein said thin film is formed on a substrate of strontium titanate.

7. A noise limiter as recited in claim 4, wherein said thin film is formed on a substrate of magnesium oxide.

8. A noise limiter as recited in claim 1, wherein said superconductive thin film comprises $A_2B_2Ca_{2n-1}Cu_nO_y$ where A is selected from the group of Bi and Tl, B is selected from the group of Ba and Sr, n is selected from the group of 1, 2 and 3, and y can assume any value between 6 and 10.

9. A noise limiter as recited in claim 1, wherein said thin film and said transmission line are integrally formed.

10. A noise limiter as recited in claim 1, wherein said superconductive thin film is connected to said transmission line at a first connection point and further comprising a second superconductive thin film held at or below its superconductive transition temperature and connected between a second connection point on said transmission line and a second predetermined potential, said second connection point being shifted in DC voltage from said first connection point.

11. In combination,
  a transmission line carrying a composite signal comprising a combination of binary signals and noise;
  a data source connect to said line for applying said binary signals to said line;
  means including a data receiver connected to said line having a characteristic impedance between said line and a predetermined potential; and
  means for limiting at least a portion of said noise appearing on said line, said limiting means comprising a superconductive thin film connected between said line and said predetermined potential and in shunt of said characteristic impedance, said thin film having a resistance in excess of said characteristic impedance for voltages appearing on said line and representative of a first value of said binary signals and having a substantially lower resistance for low voltages appearing on said line and representative of both a second value of said binary signals and a low voltage of said noise appearing on said line.

12. A noise limiter as recited in claim 1,
  whereby a component of said noise imposed on said transmission line, accompanying said binary signals of said first voltage level, and closer in size to said predetermined potential than said second voltage level is shunted to said predetermined potential.

* * * * *

UNITED STATES PATENT AND TRADEMARK OFFICE
CERTIFICATE OF CORRECTION

PATENT NO. : 5,041,415

DATED : August 20, 1991

INVENTOR(S) : Anatoly Frenkel, Chinlon Lin, and Thirumalai Venkatesan

It is certified that error appears in the above-identified patent and that said Letters Patent is hereby corrected as shown below:

Column 2, line 28, "Ti" should read --Tl--;
        line 40 before "wide" insert -- long and 25 μm--.
Column 6, line 4, "of", second occurrence, should read --or--.

Signed and Sealed this

Sixth Day of October, 1992

*Attest:*

DOUGLAS B. COMER

*Attesting Officer*      *Acting Commissioner of Patents and Trademarks*